April 24, 1956 N. E. HANDEL 2,743,358
ELECTRONIC TIME CONSTANT SYSTEM
Filed Aug. 12, 1954
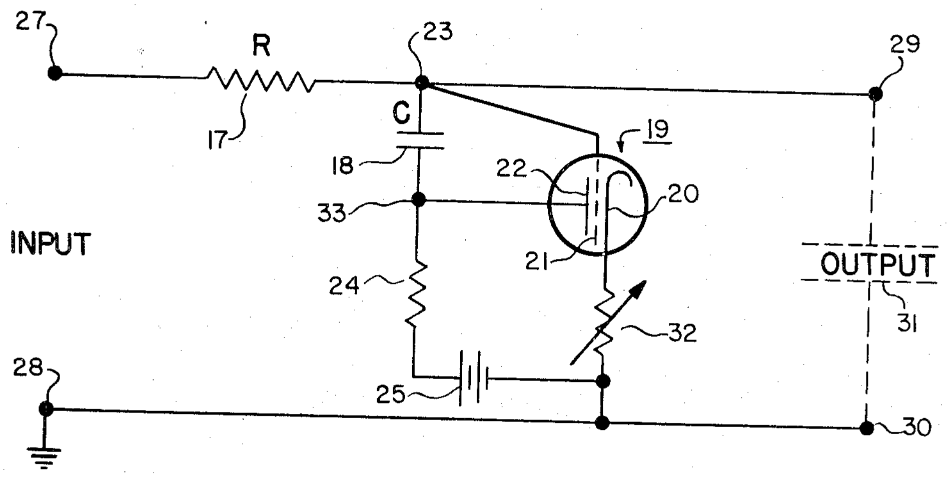
FIG. I
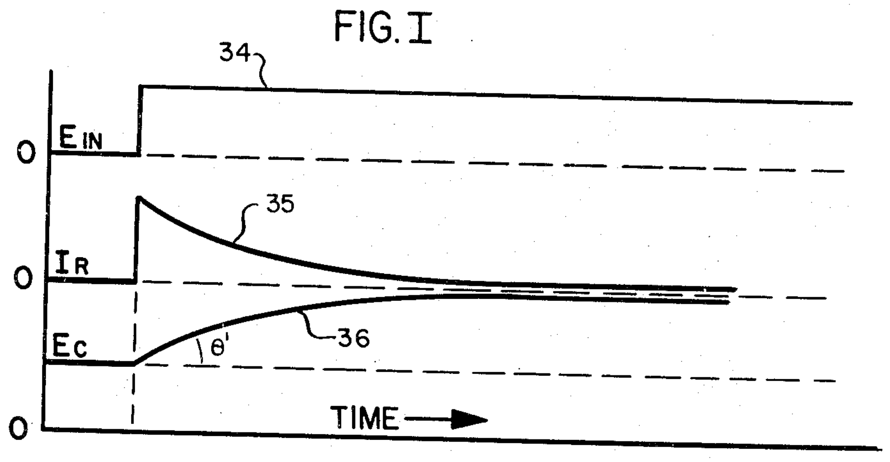
FIG. II
INVENTOR.
NEIL E. HANDEL
BY
Lawrence H. Poeton
AGENT United States Patent Office 2,743,358

Patented Apr. 24, 1956

2,743,358

ELECTRONIC TIME CONSTANT SYSTEM

Neil E. Handel, Wrentham, Mass., assignor to The Foxboro Company, Foxboro, Mass., a corporation of Massachusetts Application August 12, 1954, Serial No. 449,434

3 Claims. (Cl. 250—27)

This invention relates to electronic devices and time function arrangements therefor. It has particular reference to effective amplification of time constants in such devices.

A feature of particular importance in this invention is the provision of time constant recovery curves which closely follow the natural resistance-capacity recovery curves of processes involving flow, pressure, temperature, etc. This feature provides a changing electrical value which represents the instantaneous value of an integral, such that the instantaneous value of the integral can be used continuously to relate the operation of indicating, recording, or control apparatus, with respect to the recovery of such processes from a process upset, throughout at least the greater part of the recovery curve of such processes.

A time constant, for the purposes of this invention, is considered to be the characteristic of a device or process, which determines the rate of response of the device or process to a change in condition. Simple combinations of resistors and condensers are well known as means for providing electronic time constants. The charging of the condenser of such a combination is the factor which involves the period of time known as the time constant. This time period is the same as that which would be required to raise the potential across the condenser to equal that of the step increment if the initial rate of charge were maintained. However, the time period, or constant, produced with such simple resistor-condenser combinations is much too short, or small, for many functions unless the condenser and/or the resistor is of such a large value as to be undesirable from the standpoint of size and attendant lack of accuracy and dependability.

This invention electronically provides large time constants by effectively amplifying the capacity of a condenser in a simple resistor-condenser time constant arrangement. This effective amplification is accomplished by associating the condenser of this arrangement with a vacuum tube in such a way as to use to advantage a vacuum tube effect known as the "Miller effect." For general explanation of this effect, reference is made to the Bureau of Standards Bulletin No. 351 (1919) by J. M. Miller. For the purposes of this invention the Miller effect may be considered as the effective increase in capacity of a condenser between the plate and the grid of the tube, when the plate load is resistive. The effective capacity of this condenser under these conditions is much larger than its actual capacity. This effective amplification of capacity is a function of the gain of the tube stage and is of the order of the gain of the stage.

The use of the Miller effect to increase the effective time constant of R-C circuits has been tried in the past, with the condenser connected between the grid and plate of a tube, but in these prior circuits the output connections have been made between the plate and ground circuits of the tube being used to increase the effective capacity of a condenser connected between its plate and grid. These prior circuits have been subject to several disadvantages. For example, when they are used in an amplifier, the output from the plate is directly connected to the grid of the following tube, biasing the following tube to the static operating plate or cathode voltage of the time-constant amplifying tube. Inasmuch as these static voltages fluctuate with changes in the plate supply voltage and with changes in the tube characteristics, these changes are amplified by the succeeding tube, thus masking the desired D. C. signal. Moreover, this static potential must be balanced within the succeeding tube in order to prevent its grid voltage from being positive and to balance supply voltage fluctuation; thus resulting in complicated unsatisfactory circuit arrangements which are subject to variation in the tube characteristics. These various problems are overcome by the simple grid-to-ground output connection of the present invention.

Industrial control systems often require time constants up to and sometimes in excess of fifty minutes. These time constants are difficult to obtain electrically by simple resistance-capacity methods without involving extremely high value resistors or excessively large condensers. If the resistance is limited to a value of ten megohms, the associated condenser necessary to produce a fifty minute time constant would be 300 mfd. A paper condenser of this magnitude would be very large physically and would have poor leakage characteristics because of the large number of parallel leakage paths. In addition, adjustment of the time constant would require adjustment of the resistor or of the condenser. In either case, the adjustment is not easily made in a continuous manner. Variable resistors above 50,000 ohms are usually made of carbon and are not reliable enough for industrial control equipment.

This invention provides an electronic time constant amplifier circuit which provides a constant tracking action with respect to the recovery curve of a process and which overcomes the difficulties associated with a simple resistor-condenser (R-C) time constant arrangement. This circuit makes use of the Miller effect previously mentioned herein. An expression of this effect is:

$$C_i = C_{gk} + (M+1)C_{gp}$$

where $C_i$=effective input grid capacitance
$C_{gk}$=grid to cathode capacitance
$C_{gp}$=grid to plate capacitance
$M$=voltage gain of the stage If $C_{gk}$ is small compared to $C_{gp}$ and if M is made large, that is, greater than 10, then the expression becomes:

$$C_i = MC_{gp}$$

to a close approximation.

The above conditions can be realized by placing a large condenser of 1 to 10 mfd. between the grid and the plate of the vacuum tube, and arranging the stage so that the gain is high. Under these conditions, the grid circuit appears to have a very large capacitance from grid to ground. For a stage gain of 30 and a 1 mfd. condenser between plate and grid, there is an apparent capacitance of approximately 30 mfd. from grid to ground.

By inserting a series resistance in the grid lead, for example 10 megohms, and applying a D. C. change in potential to the input end of the resistor, a substantial time constant may be observed. Under the assumed conditions, the grid voltage will rise to 63% of its final value in 300 seconds. This 63% amount is the degree of change in potential arrived at in the time required for full potential change at the initial rate of change. This 300 second time constant is thirty times the time constant obtained by using the 10 megohms and 1 mfd. in a simple R-C circuit. With pentode amplifier circuits, gains of 200 or over may be obtained, with correspondingly larger time constants.

The effective time constant of the circuit is varied in this invention by changing the gain of the stage. The means of so changing the stage is a wire wound potentiometer of the order of 50,000 ohms, in the cathode circuit of the amplifier stage. A one hour time constant circuit uses a 12 mfd. condenser and a 10 megohm resistor. Time constant amplifiers of this nature, and in connection with this invention, have been operated over the range of thirty seconds to nine and one-half hours. In this range no leakage limitations appear, even with standard components and with no special care with respect to circuit insulation. The circuitry of this invention is simple and does not require special leakage control arrangements.

It is a particular feature of this invention that the above ground output of the time constant circuit is taken only from a point between the condenser and resistor of the R-C arrangement, and that the output terminal is in the grid lead. The output is taken as the apparent voltage from this output terminal to ground, since this voltage is proportional to the charge on the grid-to-plate condenser, that is, the actual condenser in the resistance-condenser time constant arrangement.

An advantage of this invention is that the D. C. plate voltage is blocked off from the input signal path. This is important because the plate voltage is usually many times greater than the signal voltage, and relatively small percentage changes in plate supply voltages represent very large percentage changes in reference to the signal voltages.

It is, therefore, an object of this invention to provide an improved time constant system. A further object of this invention is to provide an electronic time constant system which electronically duplicates recovery curves of processes.

Other objects and advantages of this invention will be in part apparent and in part pointed out hereinafter. The many objects and advantages of the present invention may best be appreciated by reference to the accompanying drawings, which illustrate a preferred embodiment of the present invention, and wherein:

Figure I is a diagram of a D. C. time constant circuit as an embodiment of this invention; and Figure II is a set of curves showing the time constant response of the circuit of Figure I.

Referring to Figure I, a circuit is shown as an example of how large time constants may be produced electronically. The Miller effect is here utilized to effectively amplify the time constant of a simple R-C circuit. A D. C., i. e. approximately zero frequency, system is provided which effectively amplifies the capacity of the condenser of a simple resistance-capacity time constant arrangement. The circuit comprises, generally, a resistor 17 and a condenser 18 in a simple resistor-condenser time constant arrangement, and a thermionic tube 19 associated with the condenser 18 as a Miller effect circuit. The tube 19 has therein a cathode 20, a control grid 21, and a plate 22. An output terminal 23 is located between, and is common to, the resistor 17 and the condenser 18. The time constant condenser 18 is connected between the output terminal 23 and the plate connection of the tube. The grid is connected to the common terminal 23 of the resistor 17 and the condenser 18 as an input connection. The plate of the tube is supplied from a source 25 of plate potential through a plate load resistor 24. Signal input connections 27 and 28 are provided, to the grid 21 and at ground, and the output of the circuit is through connections 29 and 30, as a voltage from the common, above ground terminal 23 to ground, with this voltage proportional to the charge on the condenser 18. The large output effective capacity is represented in dotted lines by a condenser 31 across the output connections 29 and 30.

This circuit is in effect an R-C time constant arrangement with the resistor 17 as the R and the entire tube circuit as the C. Gain adjustment of the tube is made possible through a variable resistor 32 in a lead to ground from the cathode 20, and this adjustment has the effect of varying the apparent capacity 31, and hence of effectively changing the time constant of the R-C combination. The time constant of this system is equal to the time constant of the simple R-C arrangement of the resistor 17 and the condenser 18, multiplied by the effective gain of the vacuum tube 19 plus one.

In the circuit of Figure I, if a change is made in the input voltage applied across the terminals 27 and 28, then, at the moment this potential is applied, the entire voltage appears across the resistor 17. A current flow proportional to the change of voltage and to the value of the resistor 17 is produced. Assuming that no current flows between the output terminals 29 and 30 and that the tube is operated so that its grid current flow is negligible, then the current from the resistor 17 flows into the condenser 18, causing a change in the charge and thus in the voltage across this condenser. However, in this case the resultant change in potential at the common point 23 of the resistor 17 and the condenser 18 is also applied to the grid 21 of the vacuum tube 19.

In accordance with well-known vacuum tube amplifier characteristics, there is a change in potential of the plate 22 of the tube 19 in a direction opposite to the change of grid potential, with a magnitude equal to the amount of the change of grid potential multiplied by the gain of the vacuum tube stage. Consequently, the entire change of potential as caused by the increase in charge on the condenser 18 does not appear at the point 23. A large part of this change is absorbed by a change in potential of the plate connection 33, resulting from the change of the grid potential of the tube. As mentioned above, the ratio of the change at point 23 and point 33 is equal to the numerical value of the gain of the vacuum tube amplifier.

The rate of rise of potential of the point 23 of Figure I is relatively small, in direct proportion to one plus the gain of stage of the vacuum tube 19. As the potential at point 23 moves up, the potential at point 33 moves down to a much larger extent, resulting in a potential change at point 23 of a relatively small magnitude. Since the time constant of the circuit is equal to the ratio of the change of applied voltage divided by the initial rate of rise of voltage on the output terminals resulting from this change of applied voltage, the time constant of the circuit of Figure I is increased in the same proportion that the rate of rise of voltage at point 23 is decreased. This gives an increase in time constant equal to one plus the gain of the stage of the vacuum tube 19.

This invention thus provides a circuit which in effect amplifies the time constant of a simple R-C system and makes it practical to obtain large time constants with readily available resistance and capacitance elements. Further, in the circuit of this invention, the arrangement of taking the output from the grid lead minimizes the effects of plate supply voltage fluctuations and variations in tube characteristics.

Referring to Figure II, in relation to Figure I, curve 34 indicates a step upset signal in terms of a voltage $E_{IN}$ applied across the input terminals 27 and 28. The curve 35 indicates the response to the step upset in the immediate full rise of the current $I_R$ through the resistor R, and the less rapid drop of this current as the condenser C is charged. The curve 36 indicates the rise of the voltage $E_C$, that is, the increasing charge on the condenser C. The initial rate of rise of the curve 36 is indicated by the angle $\theta'$. The purpose of this set of curves (Figure II) is to illustrate the long time constant involved in charging the condenser C of the time constant amplifier arrangement of Figure I.

This invention, therefore, provides an improved time constant system which electronically duplicates the recovery curves of processes involving various variable conditions, such as flow, pressure, and temperature.

As many embodiments may be made in the above invention, and as many changes may be made in the embodiment above described without departing from the spirit and scope of the invention as described herein and shown in the accompanying drawing, it is to be understood that all matter hereinbefore set forth or shown in the accompanying drawing is to be interpreted as illustrative only and not in a limiting sense.

I claim:

1. An electronic device comprising a direct current time constant resistor-condenser arrangement, and means for effectively amplifying the time constant of said arrangement by effectively amplifying the capacity of the condenser of said arrangement, said means comprising a vacuum tube in a Miller effect direct current arrangement with said circuit, said tube having at least a cathode, a plate, and a grid, and said arrangement including an input signal connection to said grid through said resistor and from a point common to said resistor and said condenser, a plate connection to said condenser on the side thereof removed from said input connection whereby said condenser is connected between said plate and said grid, a single output take-off, in which the output take-off connections are a point common to said resistor and said condenser and a reference point, through which a voltage proportional to the charge on said condenser may be taken off, a variable resistor in a lead to said cathode as a gain adjustment, and means for providing said tube with a resistive plate load.

2. In an electronic direct current resistance-capacitance time constant circuit said resistance being an input resistance and said capacitance being provided by a vacuum tube circuit comprising a vacuum tube having therein at least a cathode, a plate, and a grid, a grid lead directly from said resistance to said grid, a condenser with one side thereof connected to said grid lead, a plate lead having only two connections, one of said plate lead connections being to the other side of said condenser and the other of said plate lead connections being to a plate load arrangement, said plate load arrangement comprising a plate load resistor and a source of plate potential, a cathode lead, gain adjustment means in the form of a variable resistor in said cathode lead, and a pair of output terminals as the only output connections of said time constant circuit, one of said terminals being common to said plate load arrangement at a point, with respect to said plate, beyond said plate load resistor and said plate potential source and to said cathode lead at a point, with respect to said cathode, beyond said gain adjustment resistor, and the other of said output terminals being at a point common to said input resistance, said grid, and said condenser, whereby the only output connection of said plate is through said condenser and said other of said output terminals.

3. In an electronic direct current resistance-capacitance time constant circuit comprising an above-ground potential input lead and a ground potential input lead, an input resistor as the only element in said above-ground input lead, an above ground output terminal point for said time constant circuit, said output terminal point being in said input lead and, with respect to the input of said circuit, beyond said input resistor, a ground potential output terminal lead to a ground potential output terminal as a direct continuation of said ground potential input lead, and a capacitance circuit between said above-ground output terminal point and said ground potential input-output lead as the only connection between said above-ground lead and said ground potential lead, said capacitance circuit comprising a vacuum tube having therein at least a cathode, a plate, and a grid, a grid lead directly from said input resistor to said grid, a condenser with one side thereof connected to said grid lead, a plate lead having only two connections, one of said plate lead connections being to the other side of said condenser and the other of said plate lead connections being to a plate load arrangement, said plate load arrangement comprising a plate load resistor and a source of plate potential, a cathode lead, gain adjustment means in the form of a variable resistor in said cathode lead, said output terminals being the only output connections of said time constant circuit, said ground potential output terminal being common to said plate load arrangement at a point, with respect to said plate, beyond said plate load resistor and said plate potential source, and to said cathode lead at a point, with respect to said cathode, beyond said gain adjustment resistor, and said above-ground output terminal being at a point common to said input resistance, said grid, and said condenser, whereby the only output connection of said plate is through said condenser and said above-ground output terminal, said plate load arrangement and said cathode lead constituting the only connections to ground potential from any part of said capacitance circuit.

References Cited in the file of this patent

UNITED STATES PATENTS

| | | |
|---|---|---|
| 2,591,810 | Hart | Apr. 8, 1952 |
| 2,594,104 | Washburn | Apr. 22, 1952 |